United States Patent [19]

Baguioro

[11] 4,048,731

[45] Sept. 20, 1977

[54] EDUCATIONAL GAME APPARATUS

[76] Inventor: Anastasia Baguioro, c/o Lady Minto Hospital, Box 4000, 8th St., Cochrane, Ontario, Canada

[21] Appl. No.: 717,218

[22] Filed: Aug. 24, 1976

[51] Int. Cl.² .................... G09B 19/00; A63F 7/02
[52] U.S. Cl. .................................. 35/30; 273/138 R
[58] Field of Search .................... 35/30, 31 D, 73; 273/95 R, 101, 136 GB, 136 Z, 138 R, 139, 144 R, 144 A, 144 B

[56] References Cited

U.S. PATENT DOCUMENTS

| | | | |
|---|---|---|---|
| 848,711 | 4/1907 | Weaver | 35/73 UX |
| 1,116,459 | 11/1914 | McDonald | 273/95 R |
| 1,997,177 | 4/1935 | Holiday | 35/73 |
| 2,520,460 | 8/1950 | Ford | 273/101 X |
| 2,525,716 | 10/1950 | Okamoto | 273/138 R |
| 3,095,655 | 7/1963 | Berglund et al. | 273/139 X |
| 3,534,964 | 10/1970 | Guill | 273/144 A |
| 3,989,252 | 11/1976 | Mattson | 273/138 R |

FOREIGN PATENT DOCUMENTS 120,368  12/1930  Austria ............................ 35/73

Primary Examiner—William H. Grieb
Attorney, Agent, or Firm—Allen D. Brufsky

[57] ABSTRACT

A gameboard having a square array of different colored adjacent squares is slidably received in a box containing a plurality of square holes formed by upright criss-crossed partitions. The squares on the gameboard are positioned beneath one of the holes. Different colored balls, corresponding to the colors of the squares on the gameboard, are dropped through a funnel mounted above the box and come to rest in one of the holes. The balls are replaced by correspondingly colored marking discs. The process is repeated until all squares on the gameboard are covered with the discs and then the mathematical probabilities of a particular ball landing on a particular square are compared with the actual occurrence.

5 Claims, 4 Drawing Figures

EDUCATIONAL GAME APPARATUS

BACKGROUND OF THE INVENTION

This invention relates to a game apparatus, and more particularly, an educational game apparatus for teaching and demonstrating the laws of chance and mathematical probability.

The game apparatus of the present invention not only is educational, but provides fun and entertainment for hours and is subject to different variations.

SUMMARY OF THE INVENTION

In accordance with the invention, a gameboard having alternately arranged squares of different colors is slidably received in a box beneath upright criss-cross partitions forming complemental squares. A stand supports a funnel on the box above the center point of the partitions and gameboard. A pair of different colored balls, such as ping-pong balls are spun around the funnel and drop onto the partitions, bouncing on the upper edges of the partitions and finally coming to rest between adjacent walls of the partition on one of the squares of the gameboard. The ball can be replaced by a correspondingly colored or marked disc. The process is repeated. When all the squares are covered, the probability of correspondence of discs to squares on the gameboard can be computed and demonstrated.

BRIEF DESCRIPTION OF THE DRAWING

Further objects and advantages of the invention will become apparent from the following description and claims, and from the accompanying drawing, wherein:

DETAILED DESCRIPTION OF THE PREFERRED EMBODIMENT

Figure 1:
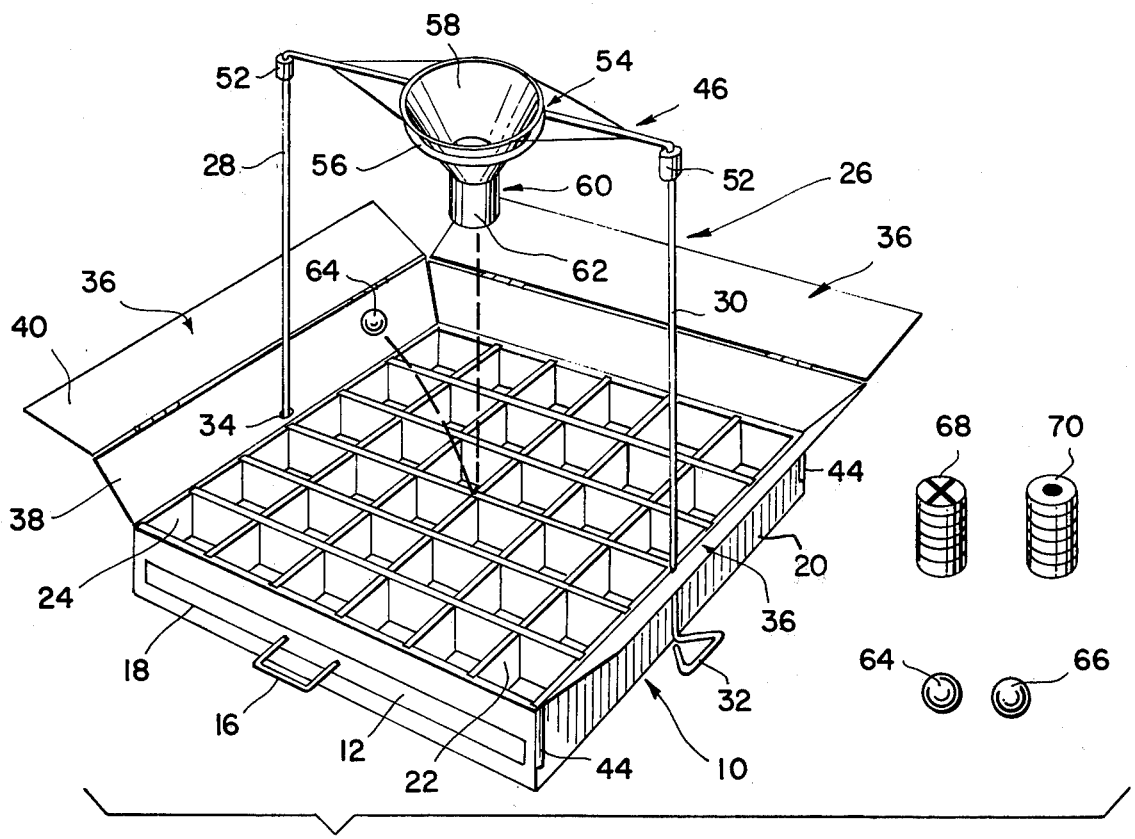
FIG. 1 is a perspective view of the game apparatus of the present invention.
Figure 4:
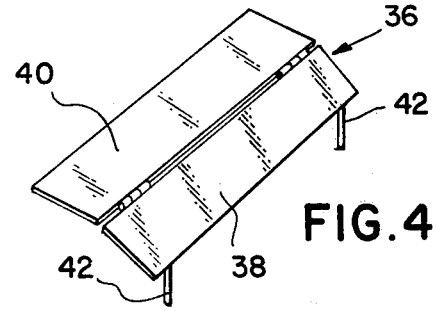
FIG. 4 is a perspective view of one of the box side panels of the apparatus of FIG. 1.
Figure 2:
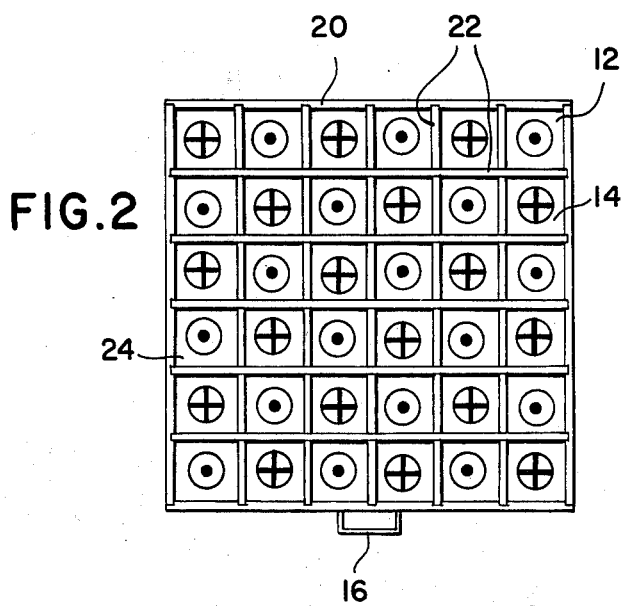
FIG. 2 is a top plan view of the gameboard and box of the apparatus of FIG. 1.
Figure 3:
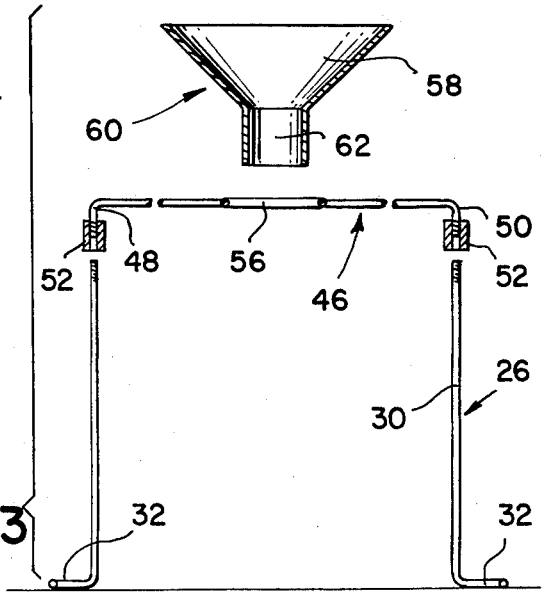
FIG. 3 is an exploded longitudinal sectional view of the stand and funnel of the apparatus of FIG. 1.

Referring now to the drawing in detail, wherein like numerals indicate like elements throughout the several views, the game apparatus 10 of the present invention includes a gameboard 12 having alternately arranged squares 14 of different colors. Markings such as "+" and "0" may also be provided in alternate squares 14 to distinguish them.

Gameboard 12 is substantially planar and includes a U-shaped handle 16 for holding and guiding the gameboard horizontally into a slot 18 in the front of a box 20. Box 20 includes upright criss-crossed partitions 22 forming complemental squares 24 positioned above each of the squares 14 on gameboard 12.

A stand 26 comprising wire uprights 28, 30 having horizontal legs 32 are placed through holes 34 in a pair of opposite side panels 36 extending from three of the top edges of box 20. Each side panel includes a sloping portion 38 hinged to a substantially horizontal portion 40. The sloping portion 40 includes depending connector pins 42 received in pockets 44 on the sidewalls of box 20. An inverted U-shaped support 46 has wire legs 48, 50 threadedly received in nuts 52 which in turn threadedly receive the upper ends of legs 28 and 30 of stand 26. The bight portion 54 of inverted U-shaped support 46 has a ring 56 slidably receiving the conical sidewall 58 of a funnel 60. Funnel 60 includes a depending cylindrical portion 62 positioned directly over the intersection of the central ones of the criss-crossed partitions 22.

In using the apparatus 10, two different colored balls 64 and 66, such as ping-pong balls corresponding to the colors of the alternate squares 14 on gameboard 12, are spun singly or together around the conical portion 58 of funnel 60. The balls will drop one at a time through cylindrical portion 62 of funnel 60 onto the intersection of the central partitions 22, bounce along the upper edges of the partitions 22 and come to rest in one of the square holes 24 between adjacent partitions over one of the squares on the gameboard 12. The sloping surfaces 38 of panels 36 confine the balls 64, 66 to the area of box 20.

The balls 64 and 66 are then replaced by a disc 68 or 70 marked with a + or 0 and corresponding in color to the + or 0 marked square 14 on gameboard 12. The process is repeated until all the squares 14 are covered, a tabulation of the number of balls 64, 66 being kept until all the squares 14 are covered.

When all the squares 14 are covered, the correspondence of discs 68 and 70 to the markings and/or colors on the squares are noted and after computing or providing the probabilities involved, these hypothetical probabilities can be compared with the actual occurrences. Obvious variations, such as using only one of the balls 64 or 66 for a given number of chances compared with the mathematical probability of entering a certain square 24, can be demonstrated, as well as mathematical combinations, all of which are within the purview of the invention.

The horizontal portion 40 of the panels 36 can be used to support discs 68 and 70 until they are used.

I claim:

1. Educational game apparatus comprising:
   a gameboard provided with a square array of adjacent squares on one surface thereof, each adjacent square being distinguished from another;
   a box including a slot in the front surface thereof slidably receiving said gameboard, in a substantially horizontal plane, said box having a plurality of criss-crossed upright partitions forming square holes positioned above each of the squares on said gameboard;
   a funnel;
   means supporting said funnel on said box above the intersection of the central ones of said partitions;
   a pair of balls each of which corresponds to one of the distinguished adjacent squares on said gameboard adapted to be thrown through said funnel to bounce along the upper edges of said partitions and come to rest in one of said square holes above one of the squares of said gameboard; and
   a disc having a marking corresponding to either of said balls adapted to be positioned on the gameboard on the square on which said corresponding ball comes to rest.

2. Game apparatus in accordance with claim 1 wherein said gameboard includes a handle attached to one edge thereof.

3. Game apparatus in accordance with claim 1 wherein said funnel includes an upper conical portion and a lower cylindrical portion approximating the diameter of one of said balls.

4. Game apparatus in accordance with claim 1 including a plurality of sloping panels removably connected to selected sides of said box to confine the balls to a selected area.

5. Game apparatus in accordance with claim 1 wherein said funnel support means includes:

a pair of upright legs straddling the sides of said box; and an inverted U-shaped mounting member connected to said upright legs, said mounting member including a ring for receiving said funnel.

* * * * *